United States Patent [19]

Savenkova et al.

[11] 3,969,129

[45] July 13, 1976

[54] METHOD OF PRODUCING INORGANIC PIGMENTS

[76] Inventors: Zinaida Alexandrovna Savenkova, ulitsa Frunze, 108, kv. 12; Dmitry Danilovich Logvinenko, ulitsa Kalinina, 5, kv. 5; Karl Lazarevich Tsantker, ulitsa Gogolya, 19, kv. 4; Oleg Porfirievich Shelyakov, ulitsa Kalinina, 5, kv. 100; Alexandra Pavlovna Manzhely, ulitsa Tsiolkovskogo, 43, kv. 53, all of Poltava; Gennady Grigorievich Bobrov, ulitsa Tolubkhina, 68, kv. 65, Yaroslavl; Genrikh Samuilovich Ioffe, ulitsa Pushkina, 18, kv. 31, Yaroslavl; Boris Vasilievich Mironov, ulitsa Chkalova, 60, kv. 57, Yaroslavl; Pavel Iosifovich Kestelman, ulitsa Chkalova, 51, kv. 53, Yaroslavl; Galina Vasilievna Egorycheva, ulitsa Chkalova, 51, kv. 18, Yaroslavl, all of U.S.S.R.

[22] Filed: Aug. 18, 1975

[21] Appl. No.: 605,556

Related U.S. Application Data

[63] Continuation of Ser. No. 485,105, July 2, 1974, abandoned, which is a continuation of Ser. No. 186,762, Oct. 5, 1971, abandoned.

[30] Foreign Application Priority Data

Oct. 12, 1970 U.S.S.R............................ 1483630

[52] U.S. Cl............................. 106/309; 106/288 B; 259/DIG. 46; 209/226; 209/227
[51] Int. Cl.$^2$........................ B03C 1/02; C09C 3/04
[58] Field of Search........................ 106/309, 288 B; 209/215, 217, 226, 227; 259/DIG. 46

[56] References Cited

UNITED STATES PATENTS

| 3,088,716 | 5/1963 | Stott | 259/114 |
| 3,219,318 | 11/1965 | Hershler | 259/1 |
| 3,245,665 | 4/1966 | Steel | 259/108 |

Primary Examiner—Winston A. Douglas
Assistant Examiner—J. V. Howard
Attorney, Agent, or Firm—Holman & Stern

[57] ABSTRACT

A method, wherein an electromagnetic field is established in which a precipitate of pigments is formed from aqueous solutions of the salts of metals in the presence of ferromagnetic solids, whereupon the precipitate is treated to obtain a finished form of pigment.

2 Claims, No Drawings

METHOD OF PRODUCING INORGANIC PIGMENTS

This is a continuation of application Ser. No. 485,105 filed July 2, 1974 which in turn is a continuation of Ser. No. 186,762 of Oct. 5, 1971, both of which are now abandoned.

The present invention relates generally to methods of producing pigments and, more specifically, to methods of producing precipitated inorganic pigments.

The present invention is particularly useful when employed to produce inorganic pigments used in paint-and-varnish, graphic arts and leather industries for pigmenting various coatings.

It is known to produce inorganic precipitated pigments, by methods such as precipitating said pigments from aqueous solutions of the salts of metals such as lead, iron, copper, titanium with subsequent processing of the precipitate to obtain a finished pigment.

Precipitation occurs in these methods by way of mechanical stirring of the parent salts.

In the now-used conventional methods, mechanical stirring occurs at low rates which results in an inadequate contact of the reactants. Also, pigments produced by the known methods feature a low colouring power (intensity).

The known methods in a majority of cases are of long duration and involve the use of cumbersome equipment to effect pigment precipitation.

It is an object of the present invention to eliminate the disadvantages mentioned above.

It another object of the present invention to develop a method of producing inorganic pigments, wherein precipitation process will occur at a high intensity.

It is an important object of the present invention to accelerate the entire process and improve painting properties of the pigments obtained.

Said and other objects are attained due to the fact that in a method of producing inorganic pigments by way of precipitating these from aqueous solutions of the salts of metals such as lead, iron, copper, titanium, with subsequent processing of the precipitate to obtain a finished form of pigment, according to the invention a rotating electromagnetic field is established within the zone of precipitation of pigments for the precipitate formation therein in the presence of ferromagnetic solids Such a method of producing pigments accelerates the pigment precipitation process, since under the effect of a rotating electromagnetic field metal ferromagnetic solids are caused to perform an intense compound motion, viz., rotation around their minor axis at a velocity close to that of rotation of the electromagnetic field, translational and oscillating motion, as well as magnetostriction oscillations (minimum magnetic induction within the zone being 0.1 T).

At the same time the nonmetallic reaction mass (solutions of salts and the resultant pigment) is subjected to the effect of electromagnetic field and acoustic vibrations, this being due to the fact that each ferromagnetic solid is in fact a point-source radiator of such vibrations. As a result the solids are set in intense random motion, thus colliding with and impinging upon one another which is rendered possible only with the use of unequiaxial solids, say, cylindrical in shape, while equiaxial solids such as globules are less liable to stir and disperse the reaction mass in electromagnetic field.

It is expedient to use solids featuring a length-to-diameter ratio of 1.1:30, since solids with lower ratio approximate to be equiaxial ones while those with higher ratio will impair the randomness of the motion thereof. Inasmuch as penetration of dispersed metal into the pigment is undesirable, ferromagnetic solids are coated with a polymer or metal such as, say, chromium.

To promote understanding, given below are a number of specific embodiments of the herein-disclosed method. The essence of the method of producing precipitated inorganic pigments resides in the fact that an electromagnetic field is established within the zone of precipitation of pigments, wherein precipitate formation occurs in the presence of ferromagnetic solids.

EXAMPLE 1

A method of producing an inorganic pigment, viz., lead chrome yellow.

A rotary magnetic field is established, its induction equalling 0.15 T and rotational speed, 3000 rpm, by resorting to any of the conventional methods, say, with the use of a generator. Then a reaction vessel of 1.5-liter capacity is placed in said field, said vessel containing 150 g of ferro-magnetic solids which are chrome-plated or coated with polyethylene. At the same time 200 ml of a lead salt solution are poured into the reaction vessel, viz., basic lead nitrite-nitrate, medium lead nitrate or lead acetate solution at a concentration of 100 g/l as referred to metallic lead, and a solution of the mixture of precipitants taken in an amount of 200–400 ml at a stoichiometric relationship with the plumbate used. The mixture of precipitants contains chromate-ion and sulphate-ion, the ratio therebetween being selected to suit the desired one in the finished chrome pigment.

The size of ferromagnetic solids is as follows: 1.8 mm in diameter, 13.6 mm in length; they are cylindrical in shape; pH value of the reaction mass 2 to 6, its temperature being 20°–50°C and pressure, atmospheric.

The residence time of the reaction mass in electromagnetic field is 0.5 to 30 sec being selected so as to provide formation of a pigment crystal having an increased colouring power.

As a result of the effect of electromagnetic field, the ferromagnetic solids and those of the pigment are set in intense motion, thus colliding with and impinging upon one another; at the same time the solids are continuously dispersed from the surface down to hundreds of a micron, thus forming additional crystal nuclei.

Due to this fact lead chromes of improved colouring properties are obtained, viz., these are capable of better painting, since, a lower amount of pigment gives a paint of the same colour.

Further, the suspension of the pigment is subjected to filtration, the pigment paste is washed and brought to a finished form of a pigment. A pigment may be obtained as a dry chrome as well, in which case the washed paste is dried and ground, or also in the form of an anhydrous paste in which case the washed paste is dried by any conventional methods.

EXAMPLE 2

A method of producing an inorganic pigment, viz., lead-molybdate chrome.

A rotary magnetic field is established similar to that described in Example 1.

A reaction vessel 1.5-liter in capacity is place in said field, said vessel containing 150 g of chrome-plated or polyethylene-coated ferromagnetic solids and 200 ml of a decinormal solution of the mixture of precipitants containing chromate-ion, sulphate-ion and molybdate-ion, the ratio therebetween being selected to suit the desired ratio in finished chrome pigment. The plumbate solution is taken in an amount somewhat greater than stoichiometric one with respect to the mixture of precipitants so that traces of lead ions be found in the reaction mass after the solution of the mixture of precipitants has been drained.

Ferromagnetic solids feature a diameter of 1.6 mm and length of 11.2 mm, their shape being cylindrical.

The reaction mass features a pH value of 2 to 5, a temperature of 20°–25°C and an atmospheric pressure.

The residence time of the reaction mass in electromagnetic field is 10 to 30 minutes being selected so as to provide formation of a crystal of pigment featuring an increased colouring power and having the desired colour.

The effect of the electromagnetic field and of the ferromagnetic solids is similar to that described in Example 1. The resultant chrome suspension is stabilized with an aluminium sulphate solution or a sodium silicate solution or with a mixture of both taken in an amount of 0.3 to 3 percent of the weight of chrome pigment yielded; thereupon the pH value of the suspension is raised to 6.3–7.0 by adding a sodium carbonate solution, the suspension is filtered, dried and ground by the known methods.

EXAMPLE 3.

A method of producing an inorganic pigment, viz., lead white.

A rotary magnetic field is established similar to that described in Example 1.

Placed in said field is a 1.5-liter reaction vessel containing 150 g of chrome-plated or polyethylene-coated ferromagnetic solids, 400 ml water, litharge (lead monoxide) and acetic acid. The latter two components are taken in stoichiometric amounts so as to obtain a solution of monobasic lead acetate at a concentration of 35–50 g/l. Then carbon dioxide is passed through the reaction vessel.

The size and shape of the ferromagnetic solids are the same as in Example 2, the temperature of the reaction mass being 20°–60°C and the pressure, atmospheric. The residence time of the reaction mass in the electromagnetic field is 1 to 5 min. The pH value of the resultant mixture is to be not below 6.4, since lower pH value due to a deeper precipitation of ions will impair the colour of the lead white produced.

As a result of the effect of the electromagnetic field, the ferromagnetic solids and those of litharge are set in intense motion thus colliding with and impinging upon one another. The solids of litharge get dispersed which contributes to their very fast dissolution in a weak acetic acid. The resultant solution of basic lead acetate reacts with carbon dioxide passed therethrough, the latter under such conditions being sparged into minutest gas bubbles, thereby substantially increasing the contact area of the reactants involved. Thus, the pigment solids result, viz., lead white. It is practicable that the amount of acetic acid be reduced below the stoichiometric amount, viz., to 1–3 g/l. In this case acetic acid released after precipitation of the lead white, will be again involved in the dissolution of litharge. Such a reduction in the amount of acetic acid used makes it possible to diminish washing time or to dispense with washing of the pigment paste altogether.

Dispersed litharge solids and those of the pigment serve as additional crystal nuclei, whereby the pigment precipitation process occurs at very high rate and the resultant pigment features a pure white colour which results from an optimum shape and size of the pigment solids. Then the suspension of the pigment is exposed to filtration, the pigment paste is washed and either is available as an aqueous paste or it is subjected to drying by conventional methods and the paste is available as an anhydrous, say, oil paste.

EXAMPLE 4

A method of producing an inorganic pigment, viz., iron oxide yellow.

A rotary magnetic field is established similar to that described in Example 1.

A 1.5-liter reaction vessel is placed in said field, said vessel containing 150 g of chrome-plated or polyethylene-coated ferromagnetic solids, 60–370 ml of a solution of ferrous sulphate at a concentration of 160 g/l as referred to $FeSo_4 \cdot 7H_2O$. Then poured into the reaction vessel is a solution of an alkaline agent, say, ammonia taken in an amount necessary for a 50-percent precipitation of the ions of bivalent iron, the precipitation temperature being 15°–25°C. Thereupon, at the same temperature the precipitate starts to be oxidized with oxygen, or air, or potassium chlorate to obtain a nucleation suspension. The end of oxidation process is judged by the nucleation suspension getting pale yellow in colour.

Then into the thus-obtained nucleation suspension is additionally introduced ferrous sulphate taken as a solution, or crystals, or a mixture of both in such an amount that the quantity of the nucleation suspension make up 6–20 percent of the expected amount of the finished pigment as referred to FeOOH. The pH value is maintained within 3 to 7 by introducing a solution of an alkaline agent such as ammonia, without interrupting the oxidation of precipitate with oxygen or air. The temperature at that stage of precipitation and oxidation is kept within 70°–85°C. The residence time of the reaction mass in electromagnetic field is 1 to 15 hours. The pigment production process is terminated upon reaching the pigment concentration in the reaction mass equal to 100–200 g/l and the desired pigment colour.

The size and shape of the ferromagnetic solids are the same as in Example 1.

As a result of the effect of electromagnetic field, the ferromagnetic solids, those of initial precipitate and oxygen or air bubbles are set in intense motion, thus colliding with and impinging upon one another so that the precipitate solids are continuously dispersed down to hundreds of a micron, while the bubbles of oxygen or air are divided into minutest ones which contributes to a higher rate of oxidation process of the initial precipitate, the formation of additional crystallization nuclei and of a desired crystal of yellow iron oxide featuring an improved colouring power and better colour characteristics.

Further the pigment suspension is filtered, the pigment paste is washed, dried and ground by conventional methods.

A variant of said example is practicable where yellow iron oxide is produced from metallic iron in a medium of an iron salt, such as ferrous sulphate.

EXAMPLE 5

A method of producing an inorganic pigment, viz., cuprous oxide.

A rotary magnetic field is established similar to that described in Example 1.

Placed in said field is a 1.5-liter reaction vessel containing 150 g of chrome-plated or polyethylene-coated ferromagnetic solids and 200 ml of a solution of cupric sulphate at a concentration of the order of 200 g/l. Then poured into the reaction vessel is a solution of sodium sulphite at a concentration of 100–150 g/l taken in stoichiometric relationship with the copper salt. The pH value of the reaction mass is maintained within 3 to 5 by adding a solution of sodium carbonate. The size and shape of ferromagnetic solids are the same as in Example 1, the temperature of the reaction mass being 20° to 50°C and the pressure, atmospheric. The residence time of the reaction mass in electromagnetic field is 0.5 to 2.0 hours, said time being selected so as to ensure a complete reduction of bivalent copper into monovalent one and the formation of a pigment with higher colouring power, better colour characteristics and an increased content of the active principle.

The effect of electromagnetic field on the ferromagnetic solids is similar to that described in Example 1.

Then the pigment suspension is filtered, the pigment paste being either available as an aqueous one or it is dewatered by means of some solvents such as acetone by conventional methods.

EXAMPLE 6

A method of producing an inorganic pigment, viz., titanium dioxide.

There is obtained from titanium concentrates a solution of titanyl-sulphate by resorting to conventional methods, containing about 200 g/l $TiO_2$, 3–5 g/l $Ti_2O_3$ and featuring a ratio of $Fe^{+2}$ and $TiO_2$ equal to 0.25:1 and that of $H_2SO_4$ and $TiO_2$, equal to 2:1. Then a nucleation suspension is prepared by the conventional methods adopted in the art.

Then an electromagnetic field is established similar to that described in Example 1.

A 1.5-liter reaction vessel is placed in said field, said vessel containing 75 g of ferromagnetic solids and 300 ml of titanyl-sulphate solution.

The ferromagnetic solids feature a diameter of 0.5–0.8 mm and a length of 1.5–2.0 mm being spiral-shaped. The solids are protected by a polymer material such as polyethylene or PVC.

The contents of the reaction vessel are heated to 70°C, whereupon the nucleation suspension is introduced thereinto in an amount of 0.5–1 percent as calculated for $TiO_2$. Further, the contents of the reaction vessel are brought to boiling point and are boiled for 0.5 hour at atmospheric, whereupon quickly diluted with one-third volume of water at 100°C and then boiled again within another half-an-hour. The residence time of the reaction mass in electromagnetic field is 1.0–1.5 hours, said time being selected so as to ensure at least a 97-percent yield of the pigment and the formation of the pigment solids having higher colouring (whitening) power and a pure white colour.

The effect of electromagnetic field on the ferromagnetic solids is similar to that described in Example 1.

Further, the thus-obtained suspension of metatitanic acid is subject, by resorting to conventional methods, to cooling, filtration, washing with a purified water to remove the ions of bivalent iron, treated with salts, calcinated and ground, and used either as a finished pigment or exposed to further treatment, dried and ground.

Similarly to the examples set forth hereinbefore, some other inorganic precipitated pigments may be produced, based on lead, copper, or cadmium, such as lead chrome orange, copper hydrate pigments, zinc chrome, etc.

What we claim is:

1. A method of producing inorganic pigments comprising the steps of: (a) generating a rotating electromagnetic field inside a reaction vessel having an inlet and an outlet opening, said electromagnetic field having an induction of at least 0.1 T; (b) introducing magnetically soft non-equiaxial ferromagnetic particles into the reaction vessel within the zone of said electromagnetic field; (c) passing a continuous flow of a solution of a salt of a metal selected from the group consisting of lead, iron, copper and titanium through the zone of the rotating electromagnetic field, thus forming a pigment precipitate; (d) subjecting the precipitate to the rotating electromagnetic field to destroy the ion crystalline lattice of the pigment so that additional crystallization centers are formed; and (e) recovering the pigment product.

2. The method as claimed in claim 1, wherein non-equiaxial ferromagnetic particles of cylindrical shape and having a length-to-diameter ratio of 1.1 to 30, are employed.

* * * * *